United States Patent
Ota

(10) Patent No.: US 7,515,307 B2
(45) Date of Patent: Apr. 7, 2009

(54) ENHANCED IMAGE PRINTING SYSTEM

(75) Inventor: Ken Ota, Cupertino, CA (US)

(73) Assignee: Konica Minolta Systems Laboratory, Inc., Foster City, CA (US)

(*) Notice: Subject to any disclaimer, the term of this patent is extended or adjusted under 35 U.S.C. 154(b) by 547 days.

(21) Appl. No.: 11/189,000

(22) Filed: Jul. 26, 2005

(65) Prior Publication Data
US 2007/0024878 A1 Feb. 1, 2007

(51) Int. Cl.
G06K 15/00 (2006.01)
B41J 29/38 (2006.01)

(52) U.S. Cl. ........................ 358/300; 358/1.9
(58) Field of Classification Search ............... 358/1.1, 358/1.9, 300, 296, 400, 402, 448, 474, 501, 358/538; 347/22, 36
See application file for complete search history.

(56) References Cited

U.S. PATENT DOCUMENTS

| 4,926,251 | A | * | 5/1990 | Sekizawa et al. | 358/535 |
| 4,975,780 | A | * | 12/1990 | Kuboki | 358/296 |
| 5,371,609 | A | * | 12/1994 | Suzuki et al. | 358/448 |
| 5,818,474 | A | * | 10/1998 | Takahashi et al. | 347/15 |
| 6,147,890 | A | * | 11/2000 | Kawana et al. | 365/49.1 |
| 6,550,910 | B2 | * | 4/2003 | Hwang | 347/108 |
| 2002/0149799 | A1 | * | 10/2002 | Hayashi | 358/406 |
| 2003/0202105 | A1 | * | 10/2003 | Gaubatz et al. | 348/207.99 |

* cited by examiner

Primary Examiner—Gabriel I Garcia
(74) Attorney, Agent, or Firm—Finnegan, Henderson, Farabow, Garrett & Dunner LLP

(57) ABSTRACT

The present application relates to a printing system in which a printing apparatus can produce print data utilizing image enhanced data stored in the printing apparatus without complicated calculation on the side of the printing apparatus.

16 Claims, 9 Drawing Sheets

ENHANCED IMAGE PRINTING SYSTEM

FIELD

The present invention relates to a printing system.

INTRODUCTION

By utilizing a printing system including a printer and a personal computer (PC), an user can print documents which the users produce by his/her PC.

For the printer, it is important to keep a same level of an image quality for a long time. However, the image quality can be variable depending on change of environmental factors (e.g., a temperature, a humidity etc.), the number of prints printed by the printer and/or the frequency of the printer use and so on. Therefore, an image correction process is often necessary to keep the image quality at the same level.

The image correction process can be conducted by processing an image data according to an image correction data (in other words, "an image enhanced data"). A complicated calculation is required to obtain the image enhanced data. Especially for a CPU or an IC of a low-price printer or copying machine, the calculation is too complicated to obtain the image enhanced data quickly.

Therefore, it is desirable that the printing system can obtain the image enhanced data quickly and conduct the image correction process quickly by using the image enhanced data in order to keep the image quality at same level even if the printer or the copying machine of the printing system is a low-price machine.

SUMMARY

According to various embodiments, the present teachings can provide a printing system. The printing system can comprise a host computer and a printing apparatus. The host computer can comprise an image enhanced data producing section which produces an image enhanced data. The printing apparatus can comprise an image enhanced data storing section which stores the image enhanced data produced by the image enhanced data producing section of the host computer. The printing apparatus can comprise a print data producing section which produces a print data. The printing apparatus can comprise a print section. The print data producing section can produce the print data by modifying a document data received by the printing apparatus according to the image enhanced data stored in the image enhanced data storing section. The print section can print according to the print data produced by the print data producing section.

The printing apparatus can comprise a detecting section. The detecting section can detect a printing apparatus condition data. The image enhanced data producing section can produce the image enhanced data based on the printing apparatus condition data detected by the detecting section.

DESCRIPTION OF CERTAIN EMBODIMENTS

A System and an Apparatus

Figure 1:
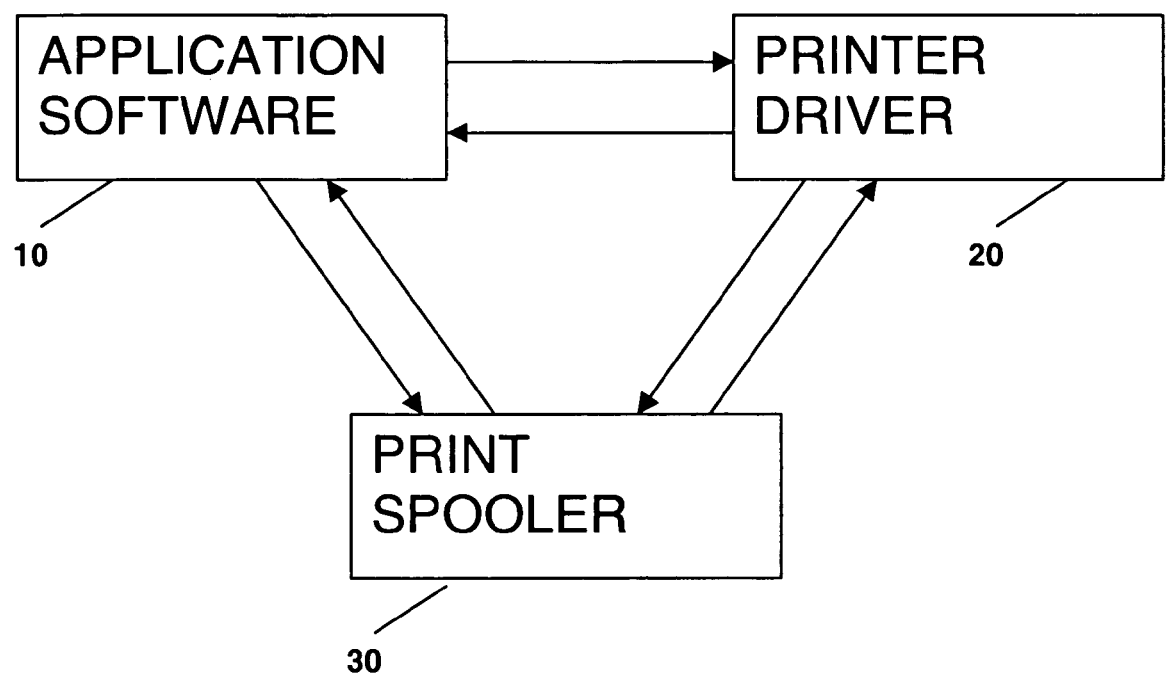
FIG. 1 illustrates a figure of relationship among application software, printer driver and print spooler, according to certain embodiments.

In certain embodiments, a printing system can comprise one or several host computer(s) and one or several printing apparatus(es). In certain embodiments, the printing system can comprise a network which connects the host computer with the printing apparatus.

Examples of the network consistent with certain embodiments of the invention include, but are not limited to, an internet, an intranet, a LAN and a wide area network (WAN). The printing apparatus and the host computer can be connected with a wire or be connected with wireless by using radio frequency (RF) and/or infrared (IR) transmission.

Examples of the host computer consistent with certain embodiments of the invention include, but are not limited to, a PC and a server computer. In certain embodiments, the host computer can comprise an image enhanced data producing section. In certain embodiments, the host computer can comprise a display section, a transmit section, a storing section, an input section and an image processing section.

In certain embodiments, the image enhanced data producing section can produce an image enhanced data. In certain embodiments, the image enhanced data producing section can produce an image enhanced data based on a printing apparatus condition data. The image enhanced data is described in detail later. Examples of the image enhanced data producing section with certain embodiments of the invention include, but are not limited to, a central processing unit (CPU) (in other words, a micro processing unit (MPU)) with a memory and a software for producing the image enhanced data, if necessary.

In certain embodiments, the display section can display an image according to several kind data such as document data stored in the host computer. Examples of the display section consistent with certain embodiments of the invention include, but are not limited to, a liquid crystal display (LCD), a Braun tube, a cathode ray tube (CRT) and a plasma display panel.

In certain embodiments, the transmit section can transmit digital data from the host computer to the printing apparatus or other devices and can receive digital data from the printing apparatus or the other devices. Examples of the transmit section consistent with certain embodiments of the invention include, but are not limited to, a local area network (LAN) adapter, a modem and a network card.

In certain embodiments, the storing section can store digital data such as the document data, second document data, print data, the image enhanced data and the like. Examples of the storing section consistent with certain embodiments of the invention include, but are not limited to, a memory (e.g., a random access memory(RAM) including NVRAM, M RAM, P RAM, Fe RAM, Flash RAM, and a read only memory (ROM)), a hard disk, a removable data recording medium recorder/reader. Examples of a removable data recording medium for the removable data recording medium recorder/reader include, but are not limited to, a digital memory card, a compact disk (e.g., CD-R, CD-RW, etc.), and a digital versatile disk (e.g., DVD-R, DVD-RW, DVD+RW, etc.). Various types of digital memory cards compatible with certain embodiments of the invention include, but are not limited to, a secure digital (SD) memory card, COMPACT FLASH™, SMART MEDIA™, MEMORY STICK™, and the like.

In certain embodiments, the user can input various information, instruction or response into the host computer through the input section. Examples of the input section consistent with certain embodiments of the invention include, but are not limited to, a keyboard, a mouse, a push button and a touch panel.

In certain embodiments, the image processing section can process document data. In certain embodiments, the image processing section can produce the print data by modifying the document data according to the image enhanced data. In certain embodiments, the image processing section can compress the print data. In certain embodiments, the image processing section can produce the second document data by modifying the document data. Examples of the image processing section consistent with certain embodiments of the invention include, but are not limited to, a CPU with a memory and a software for image processing, if necessary. In certain embodiments, the image enhanced data producing section and the image processing section can be incorporated into one same device. In certain embodiments, the image enhanced data producing section and the image processing section can be different device.

In certain embodiments, application software can be installed into the host computer in addition to operating system (OS). In certain embodiments, the application software can be used to produce the document data.

Examples of the application software consistent with certain embodiments of the invention include, but are not limited to, word processor software (e.g., Microsoft Word™ etc.), image processing software (e.g., Adobe Photoshop™ etc.), spread sheet software (e.g., Microsoft Excel™ etc) and viewer software (e.g., Acrobat Reader™ etc.).

The document data can include document, drawing, table, picture and/or photo and the like. For instance, the document data produced by the application software can be according to a command for the application software or the OS (e.g., GDI command and the like). In other words, the document data for the printer function can be the data according to the command for the application software or the OS. In certain embodiments, when a document is scanned by the scanning section, the document data can be obtained by the scanning. The document data obtained from the scanning section can be 8 bit bitmap data. In other words, the document data for the copy function can be the 8 bit bitmap data.

In certain embodiments, the document data which is according to the application software's or OS's command can be modified into the second document data which is according to the command for the printing apparatus (e.g., PS command, PCL command and the like). The second document data is also one of the document data.

In certain embodiments, the print data can be data which complies with a format of the print section of the printing apparatus so that the print section can print according to the print data. The printing apparatus can print according to the print data. For instance, the print data can be 1 bit bitmap data. In certain embodiments, the print data can be 1 bit bitmap data for each color of Y, M, C and K. In certain embodiments, the print data can be obtained by conducting the halftone processing to the document data of bitmap data. In certain embodiments, the print data can be obtained by conducting the color conversion and the halftone processing to the document data of bitmap data. In certain embodiments, the print data can be obtained by rendering the document data which is according to the command for the application software, the OS or the printing apparatus into the 8 bit bitmap data, and conducting the color conversion and/or the halftone processing to the rendered 8 bit bitmap data.

In this specification, for color printer function, rasterizing or rasterization can include at least the rendering process, the color conversion and the halftone processing. For black/white printer function, rasterizing or rasterization can include at least the rendering process and the halftone processing. For color copy function, rasterizing or rasterization can include at least the color conversion and the halftone processing, For black/white copy function, rasterizing or rasterization can include at least the halftone processing.

The print job can comprise the document data, the second document data or the print data. In certain embodiments, the print job can comprise the print condition such as number of copies, paper size and the like.

For instance, the image processing section can produce the second document data which is according to a command for the printing apparatus (e.g., PS command, PCL command and the like) by modifying the document data which is according to OS's or application software's command (e.g., GDI command). In certain embodiments, the image processing section can produce the print data which is 1 bit bitmap data for each color of Y, M, C and K by rendering the document data which is according to the OS's command to 8 bit bitmap data for each color of B, G, and R, conducting color conversion from B, G and R to Y, M, C and K and then conducting a halftone processing.

In certain embodiments, software of printer driver for the printing apparatus can be installed into the user computer. In certain embodiments, the printer driver can control the printing apparatus connected with the host computer in which the printer driver is installed. In certain embodiments, the printer driver can produce a print job. In certain embodiments, the printer driver can produce the polling signal to ask the printing apparatus condition data to the printing apparatus. In certain embodiments, the printer driver can control transmit of the print job from the host computer to the printing apparatus.

In certain embodiments, software of print spooler can be installed into the host computer. In certain embodiments, the print spooler can conduct management process of printing, that is a spooler process. Such spooler process can involve retrieving location of correct printer driver, loading that printer driver, spooling high-level function calls into the print job, scheduling print job for printing, and so on. In certain embodiments, the software of the print spooler can start at system starting time and is available until either service is stopped or OS shutdown. In certain embodiments, the application software and/or the printer driver can conduct the spooler process with the print spooler.

In certain embodiments, as illustrated in FIG. 1, relationship among the application software, the printer driver and the print spooler can be shown. In certain embodiments, application software 10 can produce the document data and send the document data to the printer driver 20. In certain embodiments, the printer driver 20 can produce the print job and send the print job to the print spooler 30. In certain embodiments. the printer driver 20 can provide printer condition to the application software 10. In certain embodiments, the print spooler 30 can store the print job sent from the printer driver. In certain embodiments, the print spooler 30 can send the print job to the printer driver 20 to send the print job from the host computer to the printing apparatus. In certain embodiments, the communication between the application software 10 and the print spooler 30 can deal with general job information (e.g., printer condition, print job status, port selection and the like).

Examples of the printing apparatus consistent with certain embodiments of the invention include, but are not limited to, a laser beam printer, a laser beam copying machine, a multi function printer including copy function (MFP), an ink jet printer, a thermal printer (e.g., dye sublimation printers) and a silver halide printer. In certain embodiments, the laser beam printer or the MFP can be preferable. In certain embodiments, the printing apparatus can comprise an image enhanced data storing section, a print data producing section and a print section. In certain embodiments, the printing apparatus can comprise a detecting section, a transmit section, a display section and an input section. In certain embodiments, the printing apparatus can comprise a scanning section.

In certain embodiments, the image enhanced data storing section can store the image enhanced data produced by the image enhanced data producing section of the host computer. Examples of the image enhanced data storing section consistent with certain embodiments of the invention include, but are not limited to, a memory (e.g., a RAM including NVRAM, M RAM, P RAM, Fe RAM, Flash RAM), a hard disk, a removable data recording medium recorder/reader. Examples of a removable data recording medium for the removable data recording medium recorder/reader are same as the examples described in the above.

In certain embodiments, the print data producing section can produce a print data. In certain embodiments, the print data producing section can produce a print data by rasterizing the document data or the second document data. In certain embodiments, the print data producing section can produce the print data which is 1 bit bitmap data for each color of Y, M, C and K by rendering the document data or the second document data which is according to the command for the printing apparatus (e.g., PS command, PCL command and the like) to 8 bit bitmap data for each color of B, G, and R, conducting color conversion from B, G and R to Y, M, C and K and then conducting a halftone processing. In certain embodiments, the print data producing section can produce the print data which is 1 bit bitmap data for each color of Y, M, C and K by conducting color conversion which is from B, G and R to Y, M, C and K to the document data which is 8 bit bitmap data to be used for the copy function and then conducting a halftone processing to the data. In certain embodiments, the print data producing section can obtain the print data by decompressing the compressed print data. Examples of the print data producing section consistent with certain embodiments of the invention include, but are not limited to, a CPU (with a memory and a software for producing the print data, if necessary) and an integrated circuit (IC), an application specific integrated circuit (ASIC), a field programmable gate array (FPGA) and a programmable logic device (PLD). For instance, a rasterizer which is an ASIC for rasterizing can be the print data producing section.

In certain embodiments, the print section can print on a recording sheet according to the print data produced by the print data producing section or the image processing section. For instance, the recording sheet can be a paper, OHP film and so on. Examples of the print section consistent with certain embodiments of the invention include, but are not limited to, a print engine or an image forming unit for the MFP, the laser beam printer and/or the laser beam copying machine, an ink jet head of the ink jet printer. In certain embodiments, the print engine or the image forming unit can comprise a laser beam scanning unit, a photo-sensitive drum (in other words, a photoconductor), a cleaning unit, an eraser lamp, a charging charger, a developing device, a transmit charger and so on. In certain embodiments, the print engine for the color printer, the color copying machine or the color MFP can comprise one laser beam scanning unit and several imaging units corresponding to each color of C, M, Y and K and comprising the photo-sensitive drum, the cleaning unit, the eraser lamp, the charging charger, the developing device, the transmit charger and so on.

In certain embodiments, the detecting section can detect a printing apparatus condition data. In certain embodiments, the detecting section can detect the printing apparatus condition data of the image forming unit for the printer function. In certain embodiments, the detecting section can detect the printing apparatus condition data of the image reading unit and the image forming unit for the copy function. Examples of the detecting section consistent with certain embodiments of the invention include, but are not limited to, an optical density sensor, a temperature sensor, a humidity sensor and a counter.

In certain embodiments, the printing apparatus condition data can be a data showing the condition of the printing apparatus. In certain embodiments, the printing apparatus condition data can be a data showing the condition of the print section (e.g., the image forming unit) of the printing apparatus. In certain embodiments, if the printing apparatus comprises the scanning section, the printing apparatus condition data can be a data showing the condition of both of the print section (e.g., the image forming unit) and the scanning section (e.g., the image reading unit) of the printing apparatus. Examples of the printing apparatus condition data consistent with certain embodiments of the invention include, but are not limited to, a data of a temperature outside and/or inside of the printing apparatus, a data of a humidity outside and/or inside of the printing apparatus, a data of an amount of prints, a data of an optical density of a sample print and a data of an optical density of a sample pattern such as a patch pattern. Examples of the printing apparatus condition data of the scanning section consistent with certain embodiments of the invention include, but are not limited to, a data of an amount of scanning and a data of a density of a sample scan.

In certain embodiments, the temperature sensor can be the detecting section to detect the data of the temperature outside and/or inside of the printing apparatus. In certain embodiments, the humidity sensor can be the detecting section to detect the data of the humidity outside and/or inside of the printing apparatus. In certain embodiments, the counter can be the detecting section to detect the data of the amount of prints. In certain embodiments, the optical density sensor can be the detecting section to detect the data of the optical density of the sample print of the recording sheet or the data of the optical density of the sample pattern such as the patch pattern on the photoconductor or the transmit belt.

In certain embodiments, the transmit section can transmit digital data from the printing apparatus to the host computer or other devices and can receive digital data from the host computer or other devices. Examples of the transmit section is same as the examples described in the above.

In certain embodiments, the display section can display a message of instruction and/or condition of the printing apparatus. Examples of the display section is same as the examples described in the above.

In certain embodiments, the user can input various information, instruction or response into the printing apparatus through the input section. Examples of the input section is same as the examples described in the above.

In certain embodiments, the scanning section can scan a printed document, books, photos, paintings and the like to obtain the document data which is a bitmap data. Examples of the scanning section consistent with certain embodiments of the invention included, but are not limited to, an image reading unit, a flat bed image scanner and a handy scanner.

A Way to Produce an Image Enhanced Data

In certain embodiments, the printing apparatus condition data such as the temperature data, the humidity data, the print amount data or the optical density data of the patch pattern or the sample print can be detected by the detecting section of the printing apparatus.

In certain embodiments, the printing apparatus condition data can be detected by the detecting section when the printing apparatus is turned on. In certain embodiments, the printing apparatus condition data can be detected by the detecting section when the printing apparatus prints a predetermined amount of papers (e.g., every 50 sheets, every 100 sheets, every 200 sheets, every 1000 sheets or the like). In certain embodiments, the printing apparatus condition data can be detected by the detecting section periodically (e.g., every day, every week, every month or the like). In certain embodiments, the printing apparatus condition data can be detected by the detecting section when an environmental condition of the printing apparatus changes drastically. For instance, the printing apparatus can judge that the environmental condition changes drastically if the difference of temperature outside and/or inside the printing apparatus between the current temperature and the temperature detected in the last time is more than 5° C., 10° C. or 15° C. or the temperature outside and/or inside the printing apparatus changes by 5° C., 10° C. or 15° C. within the predetermined period (e.g., 1 hour, 2 hours, 1 day and the like). In certain embodiments, the printing apparatus can judge that the environmental condition changes drastically, when the difference of humidity outside and/or inside the printing apparatus between the current humidity and the humidity detected in the last time is more than 5%, 10% or 15% or the humidity outside and/or inside the printing apparatus changes by 5%, 10% or 15% within the predetermined period (e.g., 1 hour, 2 hours, 1 day and the like).

Figure 2:
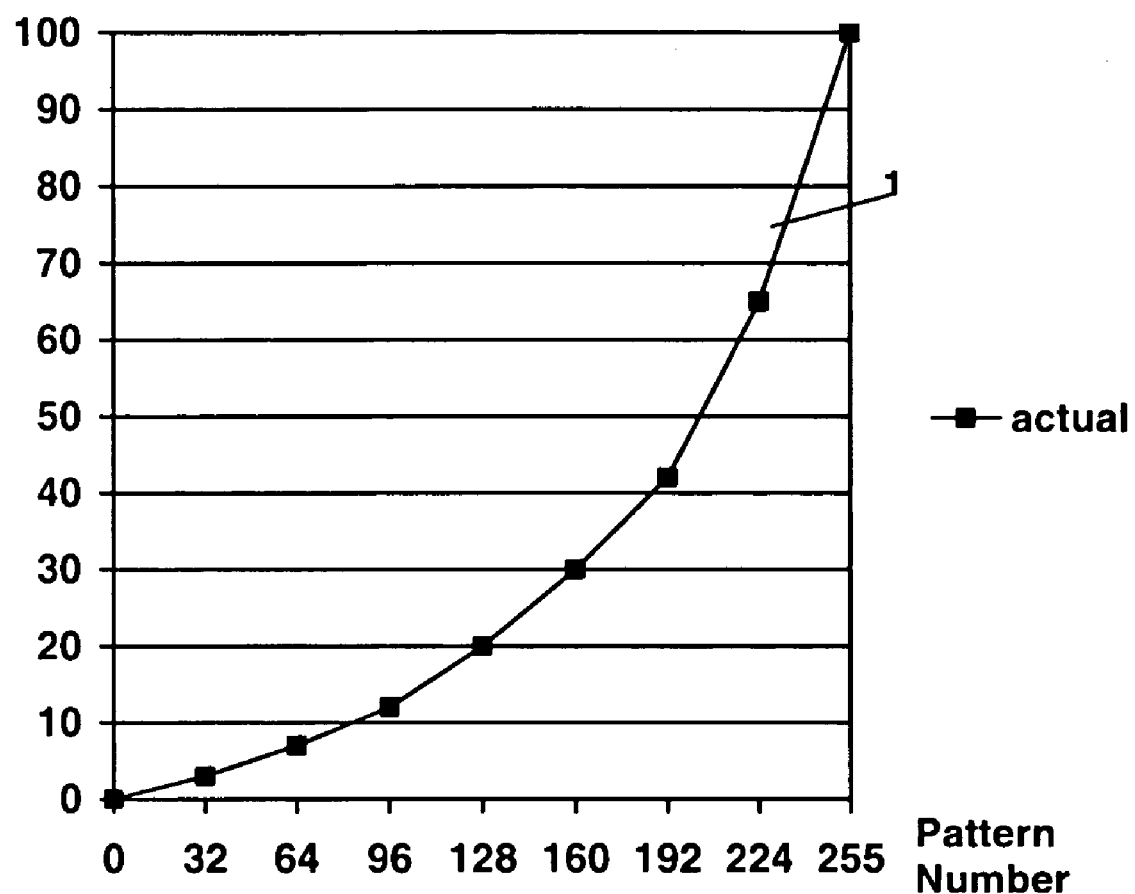
FIG. 2 illustrates a graph showing relationship between the actual optical density data and pattern number of patch pattern

In certain embodiments, the optical density sensor as the detecting section can detect the optical density data, which is the printing apparatus condition data, of the several patch patterns formed by the toner on the photoconductor or the transmit belt as the printing apparatus condition data. The several patterns correspond to several pattern numbers. In certain embodiments, as illustrated in FIG. 2, the optical density data 1 of several patch patterns formed on the photo conductor or the transmit belt can be detected by the optical density sensor. Each patch patterns is formed with data corresponding to each pattern number (e.g., $0^{th}$, $32^{nd}$, $64^{th}$, $96^{th}$, $128^{th}$, $160^{th}$, $192^{nd}$, $224^{th}$, $256^{th}$ and the like) of dither pattern. In certain embodiments, the optical density data of patch patterns for four, ten, twenty, forty or more pattern numbers can be detected. In certain embodiments, the optical density of the several kinds of pattern number for each color of Y, M, C and K can be detected.

In certain embodiments, the printing apparatus condition data of the scanning section can be detected when the printing apparatus condition data of the print section is detected.

In certain embodiments, the printing apparatus condition data detected by the detecting section can be stored by the image enhanced data storing section of the printing apparatus. In certain embodiments, the old printing apparatus condition data can be deleted from the image enhanced data storing section when the new printing apparatus condition data detected is stored in the image enhanced data storing section.

In certain embodiments, the printing apparatus condition data detected by the detecting section can be transmitted from the printing apparatus to the host computer by the transmit section of the printing apparatus. In certain embodiments, the printing apparatus condition data can be transmitted from the printing apparatus to the host computer every time after the detecting section detects the new printing apparatus condition data. In certain embodiments, when the user inputs the instruction from the input section of the printing apparatus so that the printing apparatus sends the printing apparatus condition data to the host computer and obtains the image enhanced data from the host computer, and the printing apparatus sends a broad casting signal, then after receiving a first reply signal from the host computer, the printing apparatus condition data can be sent from the printing apparatus to the host computer which sends the first reply. In certain embodiments, the printing apparatus condition data stored in the image enhanced data storing section of the printing apparatus can be transmitted from the printing apparatus to the host computer when the printing apparatus receives a polling signal sent from the host computer. In certain embodiments, the printing apparatus condition data of the scanning section can be transmitted with the printing apparatus condition data of the print section from the printing apparatus to the host computer when the printing apparatus condition data of the print section is transmitted from the printing apparatus to the host computer. In certain embodiments, the host computer can install a software for producing the polling signal. In certain embodiments, the software of the printer driver can produce the polling signal.

In certain embodiments, the host computer can send the polling signal to the printing apparatus periodically (e.g., every 1 hour, every 5 hours. every 1 day, every 1 week, every 1 month and the like). In certain embodiments, when the host computer receives an instruction of start printing from the user via the input section, the host computer can send the polling signal to the printing apparatus. In certain embodiments, every time after when the host computer receives an instruction of start printing, the host computer can send the polling signal. In certain embodiments, the host computer can send the polling signal per several times (e.g., 5 times, 10 times, 30 times and the like) of receiving the instruction of start printing. In certain embodiments, when the host computer sends the document data to be printed by the printing apparatus and/or the instruction signal of start printing, the host computer can send the polling signal to the printing apparatus with the document data and/or the instruction signal of start printing.

In certain embodiments, the printing apparatus condition data transmitted from the printing apparatus to the host computer can be stored in the storing section of the host computer. In certain embodiments, when the new printing apparatus condition data is stored in the storing section, the old printing apparatus condition data can be deleted. In certain embodiments, the new printing apparatus condition data transmitted from the printing apparatus can be compared by the host computer with the old printing apparatus condition data stored in the storing section of the host computer. If the new printing apparatus condition data is same as the old printing apparatus condition data, the new printing apparatus condition data may not be stored in the storing section and the image enhanced data producing section of the host computer may not produce the new image enhanced data. If the new printing apparatus condition data is different from the old printing apparatus condition data, the image enhanced data producing section can produce the image enhanced data based on the new printing apparatus condition data.

In certain embodiments, the image enhanced data can be produced by the image enhanced data producing section of the host computer based on the printing apparatus condition data transmitted from the printing apparatus.

In certain embodiments, the image enhanced data can be a correction data to correct the document data or the second document data so that the print image can be a correct image. In certain embodiments, the image enhanced data can be a complementary data to enhance an image quality of the print image. Examples of the image enhanced data consistent with certain embodiments of the invention include, but are not limited to, a density correction data, a moiré removal data, a sharpness enhancement data and a color correction data.

In certain embodiments, the moire removal data can be a data to remove the moiré from the print image. In certain embodiments, the color correction data can include the color correction data, the color brightness correction data and the color conversion data.

In certain embodiments, the density correction data can be a correction data to enhance the image quality of print and/or to make the print image close to the original image by adjusting or correcting the density. Examples of the data of the density correction data consistent with certain embodiments of the invention include, but are not limited to, a half-tone and a tone curve.

Figure 3:
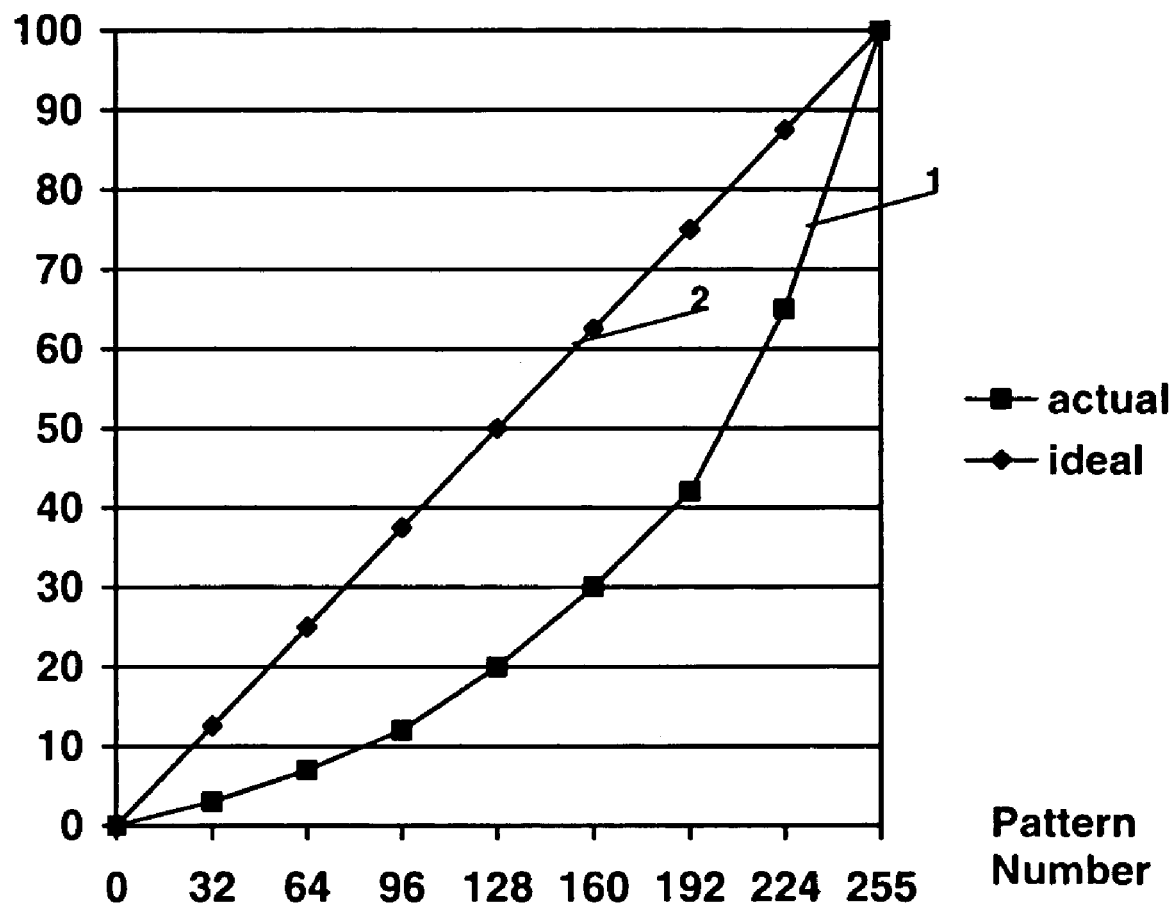
FIG. 3 illustrates a graph showing relationship between the actual optical density data and pattern number of patch pattern and the relationship between the ideal optical density data and pattern number of patch pattern.

In certain embodiments, the printing apparatus condition data such as the optical density data 1 shown in FIG. 2 can be transmitted from the printing apparatus to the host computer. In certain embodiments, as illustrated in FIG. 3, an ideal printing apparatus condition data such as an ideal optical density data 2 for each pattern number can be stored in the storing section of the host computer. For instance, when the software of the printer driver including the ideal printing apparatus condition data is installed in the host computer, the ideal printing apparatus condition data can be stored in the storing section. Then, the detected density data 1 as the printing apparatus condition data can be compared with the ideal optical density data 2. In certain embodiments, the ideal printing apparatus condition data can be stored in the printing apparatus and the ideal printing apparatus condition data can be transmitted from the printing apparatus to the host computer with the detected printing apparatus condition data.

In certain embodiments, according to the result of the comparison between the detected printing apparatus condition data and the ideal printing apparatus condition data, the image enhanced data producing section of the host computer can calculate and produce the image enhanced data. For instance, according to the result of the comparison between the detected optical density data 1 and the ideal optical density data 2, the image enhanced data producing section of the host computer can produce the half tone data as the density correction data by reorganizing the halftone data so that the actual optical density data 1 can be getting same or close to the ideal optical density data 2. In certain embodiments, according to the result of the comparison between the detected optical density data 1 and the ideal optical density data 2, the image enhanced data producing section of the host computer can produce the tone curve data as the density correction data by modifying the tone curve data so that the actual optical density data 1 can be getting same or close to the ideal optical density data 2. In certain embodiments, the image enhanced data producing section can produce the half tone data or the tone curve as the density correction data by reorganizing the halftone data or the tone curve according to the inverse function so that the actual optical density data 1 can be getting same or close to the ideal optical density data 2.

In certain embodiments, the temperature data and/or the humidity data as the printing apparatus condition data can be transmitted from the printing apparatus to the host computer. In certain embodiments, the storing section of the host computer can store several image enhanced data each of which is corresponding to each temperature and/or humidity. The image enhanced data corresponding to the temperature and/or humidity which is the closest to the detected temperature data and/or the detected humidity data can be extracted and the extracted image enhanced data can be utilized for the correction of the document data. In certain embodiments, the several image enhanced data corresponding to several temperature and/or humidity can be stored as a form of a look up table.

In certain embodiments, the image enhanced data utilized for a copy function can be different from the image enhanced data utilized for a printer function. The image enhanced data for the copy function can be produced based on the printing apparatus condition data of not only the print section but also the scanning section. On the other hand, the image enhanced data for the printer function can be produced based on the printing apparatus condition data of the print section only. In certain embodiments, the image enhanced data for the copy function can be produced with the image enhanced data for the printer function when the image enhanced data for the printer function is produced.

In certain embodiments, the image enhanced data produced by the image enhanced data producing section can be stored in the storing section of the host computer. In certain embodiments, the old image enhanced data can be deleted from the storing section when the new image enhanced data is stored in the storing section.

In certain embodiments, the image enhanced data produced by the image enhanced data producing section can be transmitted by the transmit section of the host computer from the host computer to the printing apparatus.

In certain embodiments, the image enhanced data can be transmitted with the document data or the print data and/or the instruction signal of start printing from the host computer to the printing apparatus when the document data or the print data and/or the instruction signal is transmitted from the host computer to the printing apparatus. In certain embodiments, the image enhanced data can be transmitted with the document data or the print data and/or the instruction signal whenever the document data or the print data and/or the instruction signal is transmitted from the host computer to the printing apparatus. In certain embodiments, the image enhanced data can be transmitted with the document data or the print data and/or the instruction signal every time after the predetermined amount of the document data or the print data and/or the instruction signal is transmitted from the host computer to the printing apparatus. In certain embodiments, the image enhanced data can be transmitted with the document data or the print data and/or the instruction signal periodically.

In certain embodiments, the image enhanced data stored in the storing section of the host computer can be transmitted from the host computer to the printing apparatus every time after the host computer and the printing apparatus is connected electrically.

In certain embodiments, the image enhanced data can be transmitted from the host computer to the printing apparatus every time after the image enhanced data producing section produces the new image enhanced data.

In certain embodiments, the image enhanced data utilized for a copy function can be transmitted with the image enhanced data utilized for a printer function from the host computer to the printing apparatus whenever the image enhanced data utilized for the printer function is transmitted to the printing apparatus.

In certain embodiments, the image enhanced data transmitted from the host computer can be received by the printing apparatus and the image enhanced data can be stored in the image enhanced data storing section of the printing apparatus. In certain embodiments, when the new image enhanced data is transmitted to the printing apparatus, the old image enhanced data stored in the image enhanced data storing section can be deleted and the new image enhanced data can be stored in the image enhanced data storing section.

In certain embodiments, the print data can be produced by modifying the document data or the second document data according to the image enhanced data by the print data producing section or the image processing section. In certain embodiments, the print data can be produced by rasterizing the document data or the second document data according to the image enhanced data by the print data producing section or the image processing section. In certain embodiments, the print data can be produced by modifying the document data or the second document data according to the image enhanced data stored in the image enhanced data storing section of the printing apparatus. In certain embodiments, the print data can be produced by modifying the document data or the second document data according to the image enhanced data stored in the storing section of the host computer. In certain embodiments, the print data can be produced by the print data producing section of the printing apparatus by modifying the document data or the second document data received by the printing apparatus according to the image enhanced data stored in the image enhanced data storing section of the printing apparatus.

In certain embodiments, if the printing apparatus comprises the scanning section, the copy function of the printing apparatus can be used.

In certain embodiments, whenever the copy function of the printing apparatus is used, the print data can be produced by the print data producing section according to the image enhanced data stored in the image enhanced data storing section. In certain embodiments, when the copy function of the printing apparatus is used and the printing apparatus is not connected with the host computer electrically, the print data can be produced by the print data producing section according to the image enhanced data stored in the image enhanced data storing section. In certain embodiments, when the copy function of the printing apparatus is used and the printing apparatus is connected with the host computer electrically, the new image enhanced data can be produced by the host computer and the print data can be produced by the host computer.

In certain embodiments, the printing apparatus can have a printer function.

In certain embodiments, when the printer function of the printing apparatus is used, the image enhanced data stored in the image enhanced data storing section of the printing apparatus may not be used in order to make the print data.

In certain embodiments, when the printer function of the printing apparatus is used, the host computer can send the polling signal to the printing apparatus, receive the printing apparatus condition data from the printing apparatus, produce the new image enhanced data, produce the print data by using the new image enhanced data and send the new image enhanced data with the print data to the printing apparatus so that the printing apparatus can store the new image enhanced data. In certain embodiments, when the printer function of the printing apparatus is used, the host computer can produce the new image enhanced data based on the print condition data stored in the host computer, produce the print data by using the new image enhanced data and send the new image enhanced data with the print data to the printing apparatus. In certain embodiments, when the printer function of the printing apparatus is used, the host computer can use the image enhanced data stored in the host computer in order to make the print data and send the new image enhanced data with the print data to the printing apparatus. In certain embodiments, when the printer function of the printing apparatus is used, the host computer can produce the new image enhanced data based on the print condition data, produce the second document data and send the new image enhanced data with the second document data to the printing apparatus. Then, the printing apparatus can produce the print data based on the second document data and the image enhanced data.

In certain embodiments, when the printer function of the printing apparatus is used, the image enhanced data stored in the image enhanced data storing section of the printing apparatus can be used in order to make the print data.

In certain embodiments, when the printer function of the printing apparatus is used, the image enhanced data stored in the image enhanced data storing section can be used in order to make the print data if it is judged that the image enhanced data stored in the image enhanced data storing section is not different from the image enhanced data stored in the storing section of the host computer. If it is judged that the image enhanced data stored in the image enhanced data storing section is different from the image enhanced data stored in the storing section, the image enhanced data stored in the storing section can be used in order to produce the print data. In certain embodiments, when the printer function of the printing apparatus is used, the image enhanced data stored in the image enhanced data storing section can be used in order to make the print data if it is judged that the printing apparatus condition data stored in the storing section is not changed from the printing apparatus condition data used to make the last image enhanced data. If it is judged that the printing apparatus condition data stored in the storing section is changed from the printing apparatus condition data used to make the last image enhanced data, the new image enhanced data can be produced based on the new printing apparatus condition data and can be used in order to make the print data. In certain embodiments, when the printer function of the printing apparatus is used, the host computer can produce the second document data and send the second document data to the printing apparatus. Then, the printing apparatus can produce the print data based on the second document data and the image enhanced data stored in the image enhanced data storing section.

In certain embodiments, when the printer function of the printing apparatus (e.g., a PS printer) is used, the second document data can be produced by modifying the document data by the image processing section of the host computer. Then, the second document data can be sent from the host computer to the printing apparatus. The print data can be produced by rasterizing the second document data according to the image enhanced data by the print data producing section of the printing apparatus. The printing apparatus can print according to the print data.

In certain embodiments, when the printer function of the printing apparatus (e.g., a raster printer), the print data can be produced by rasterizing the document data according to the image enhanced data by the image processing section of the host computer. Then, the print data can be sent from the host computer to the printing apparatus. The printing apparatus can print according to the print data. In certain embodiments, the raster printer can be a printing apparatus which prints according to the print data of the bitmap data which is produced by the host computer.

The removable data recording medium can store program for performing the above procedures. In certain embodiments, the removable data recording medium that stores instructions, which when executed by the host computer perform steps in a method for representing configuration options available on devices in a printing system comprising the host computer and the printing apparatus, the steps can comprise obtaining the printing apparatus condition data from the printing apparatus, and producing an image enhanced data based on the printing apparatus condition data. Also, the steps can further comprise transmitting the polling signal from the host computer to the printing apparatus to request a printing apparatus condition data, and transmitting the image enhanced data from the host computer to the printing apparatus with document data or print data every time when the document data or the print data is transmitted from the host computer to the printing apparatus

EXAMPLE

Figure 4:
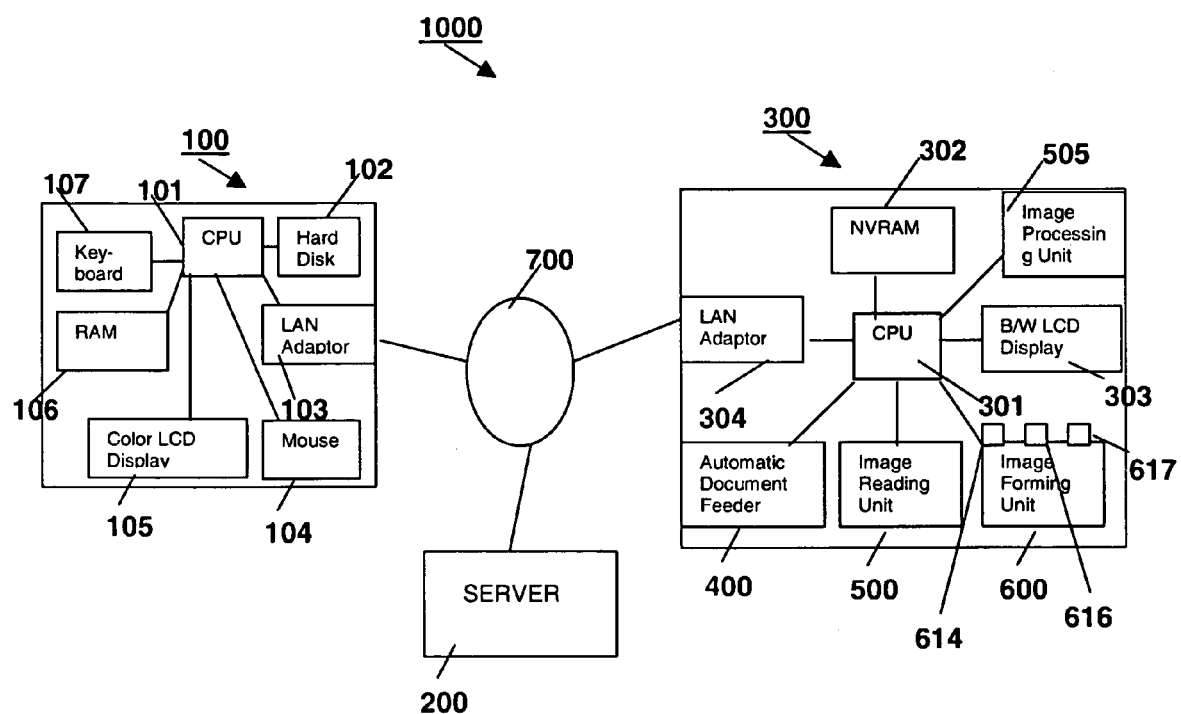
FIG. 4 illustrates a block diagram of a printing system comprising a PC and a color MFP, according to certain embodiments.

In certain embodiments, as illustrated in FIG. 4, the printing system (e.g., a printing system 1000) can comprise a host computer (e.g., a PC 100), a server (e.g., a server 200), a printing apparatus (e.g., a color multi functional printer (color MFP) 300) and a LAN 700 connecting the PC 100, the server 200 and the color MFP 300.

In certain embodiments, as illustrated in FIG. 4, the PC 100 can comprise an image enhanced data producing section (e.g., a CPU 101 and a RAM 106 with necessary software for producing the image enhanced data), an input section (e.g., a mouse 104 and a keyboard 107), a storing section (e.g., the RAM 106 and a hard disk 102), a display section (e.g., a color LCD display 105), an image processing section (e.g., the CPU 101 and the RAM 106 with necessary software for image processing and/or rasterizing) and a transmit section (e.g., a LAN adaptor 103).

In certain embodiments, the OS and the application software (e.g., Microsoft Word, Adobe Photoshop and the like) recorded on a CD-ROM can be installed in the PC. In certain embodiments, the printer driver for the color MFP 300 recorded on a CD-ROM can be installed in the PC. The printer driver can include program for producing the image enhanced, rasterizing to produce the print data and producing the print job comprising the compressed print data and the print condition.

In certain embodiments, the color MFP 300 can provide copy function, scanner function and printer function. In certain embodiments, the color MFP can be a raster printer. In certain embodiments, as illustrated in FIG. 4, the color MFP 300 can comprise an image enhanced data storing section (e.g., a NVRAM 302), a print data producing section (e.g., an image processing unit 505 comprising an ASIC called a rasterizer for rasterizing), a print section (e.g., an image forming unit 600), a detecting section (e.g., an optical density sensor 614, a counter (not shown), a temperature sensor 616 and a humidity sensor 617), a display section (e.g., a black and white LCD 303), a scanning section (e.g., an image reading unit 500), an input section (e.g., an operation panel (not shown)), an automatic document feeder 400, a transmit section (e.g., a network card 304) and a CPU 301.

Figure 5:
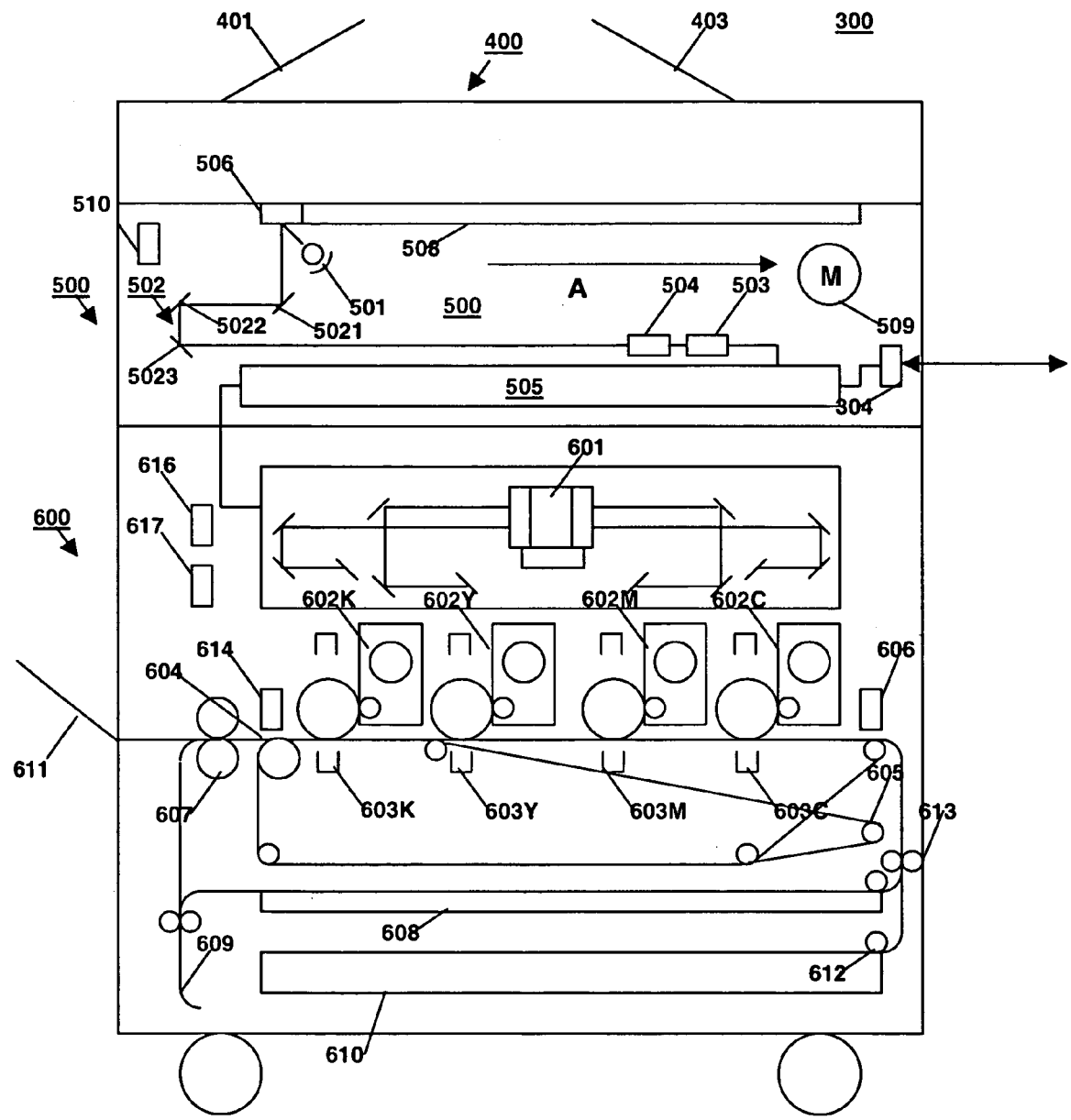
FIG. 5 illustrates a schematic cross sectional view showing overall construction of color MFP, according to certain embodiments.

In certain embodiments, as illustrated in FIG. 5, in the color MFP 300, the image forming unit 600 can form an image based on the document data obtained by the image reading unit 500 reading a document or the print data sent from the host computer 100 through the Network card 304. The automatic document feeder 400 can be provided on the image reading unit 500.

Here, for the copy function, an image can be typically formed in the following way. A document can be fed to an image reading position by the automatic document feeder 400 and be read by the image reading unit 500, and the obtained document data which is a bitmap data of 8 bit for each color of R, G, and B can be converted to the print data by the image processing unit 505. Then, the print data can be transmitted to the image forming unit 600, which forms the image on a recording sheet.

The automatic document feeder 400 can feed a document set on a document feed tray 401 to the image reading position of the image reading unit 500, and after the image is read, can discharge the document to a document discharge tray 403. The document transportation operation can be accomplished in accordance with instructions from the operation panel (not shown), and the document discharge operation can be accomplished in accordance with a reading end signal from the image reading unit 500. When a plurality of documents are stacked on the document feed tray 401, these control signals can be continuously generated to sequentially transport the documents, read images of the documents, and discharge the documents.

In the image reading unit 500, an exposure lamp 501 can illuminate the document placed on a document glass 508, and a mirror group 502 including three mirrors 5021 to 5023 and a lens 503 can direct the light reflected by the document to form an image on a CCD sensor 504. The exposure lamp 501 and the first mirror 5021 can be driven by a scan motor 509 in the direction of arrow A at a speed V corresponding to the magnification ratio, so as to scan the entire surface of the document placed on the document glass 508. While the document is being scanned using the exposure lamp 501 and the first mirror 5021, the second mirror 5022 and the third mirror 5023 can move in the direction of arrow A at a speed V/2. The position of the exposure lamp 501 can be calculated and controlled, using the amount of movement from the home position, i.e., using the number of steps of the scan motor 509 and detection signals from a scan home position sensor 510. The reflected light entering the CCD sensor 504 can be converted into electric signals within the CCD sensor 504. The image processing unit 505 then can subject the electric signals to various image processing, such as analogue processing, analogue-to-digital (AD) conversion and the document data which is the bitmap data of 8 bit for each color for R(red), G(green) and B(blue) can be obtained. Then, the image processing unit can subject the document data to various image processing, such as the color conversion and the halftone and the print data which is the bitmap data of 1 bit for each color for Y(yellow), M(magenta), C(cyan) and K(black) can be obtained. The print data can be transmitted to the Network card 304 or to the image forming unit 600. A white shading correction plate 506 can be arranged in close proximity to the document reading start position of the document glass 508. Prior to reading the document, the shading correction plate 506 can be read to generate correction data for shading correction.

The color MFP 300 can be connected to external devices, such as the PC 100, via the Network card304. This connection can provide the color MFP 300 with additional features such as the scanner function for outputting document data read by the image reading unit 500 to an external device, and the printer function for receiving the print data from an external device or the PC 100 and forming an image by the image forming unit 600 based on the print data.

Here, for the printer function, an image can be typically formed in the following way. The print data which is the bitmap data of 1 bit for each color of Y, M, C and K and is compressed can be sent from the external device or the PC 100 to the Network card 304. The image processing unit 505 then can decompress the compressed print data. Then, the decompressed print data can be obtained The print data can be transmitted to the image forming unit 600.

Next, the following describes the image forming unit 600. First, exposure and imaging are described.

The print data of each of colors C, M, Y, and K transmitted from the image processing unit 505 can be transmitted to a control unit of each exposure head (not shown). The control unit of each exposure head can make a laser emit a laser beam in accordance with a pixel value of the print data, and perform a one-dimensional scan with the emitted laser beam via a polygon mirror 601, to optically expose the surface of a photoconductor in each of the imaging units 602C, 602M, 602Y, and 602K.

In each of the imaging units 602C to 602K, elements required for an electrophotographic process can be arranged around the periphery of a photoconductor. The electrophotographic process is continuously performed as the photoconductor for each of C, M, Y, and K can be rotated clockwise. The imaging units 602C to 602K necessary for forming an image each can be integrated, and can be detachable from the body. The latent images formed on the photoconductors in the imaging units 602C to 602K by the above exposure can be developed by developing units of respective colors. The toner images developed on the surface of the photoconductors in the imaging units 602C to 602K can be transmitted onto a recording sheet transported on a paper transport belt 604, by transmit chargers 603C to 603K respectively arranged to face the photoconductors in the imaging units 602C to 602K within the paper transport belt 604.

The following describes the recording sheet feeding, transport, and fixing operations. The recording sheet onto which an image is to be transmitted can be fed to the transmit position in the following sequence and the image can be formed on the recording sheet. Recording sheets are loaded beforehand in paper feed cassette 610. A recording sheet can be fed to the transport path by the paper feed roller 612 mounted on the paper feed cassette 610.

The recording sheet fed to the transport path can be transported onto the paper transport belt 604 by a transport roller pair 613. Here, a reference mark on the paper transport belt 604 can be detected by a timing sensor 606, so that a transport timing of the recording sheet can be adjusted. Also, in the imaging units 602C to 602K, three optical density sensors 614 can be arranged along the main scanning direction furthest downstream in the direction of the transportation of the recording sheet. When a registration pattern is formed on the paper transport belt 604, the amount of color aberration can be detected in the main scanning direction and the sub scanning direction of the C, M, Y, and K images by the optical density sensors 614. Print image correction and image distortion correction can be performed by a print image control unit (PIC unit). As a result, color aberration on the recording sheet can be prevented. The toner image transmitted onto the recording sheet can be fused and fixed thereon via heating by the fixing roller pair 607, and then the recording sheet can be discharged to a discharge tray 611.

Note that in the case of duplex copies, an image can be formed on the back side of the recording sheet in the following way. The recording sheet on which the toner image is fixed by the fixing roller pair 607 can be inverted by a paper inverting unit 609, and is guided to a duplex unit 608, which re-feeds the recording sheet to the transport path. Note also that the paper transport belt 604 can be retracted from the imaging units 602C, 602M, and 602Y of colors C, M, and Y, by up and down movement of a belt retracting roller 605, so as not to contact the photoconductors therein. When a monochrome image is formed, therefore, the imaging units 602C, 602M, and 602Y are not driven. This can decrease wear of the photoconductors and the other components in the imaging units 602C, 602M, and 602Y.

Figure 6A:
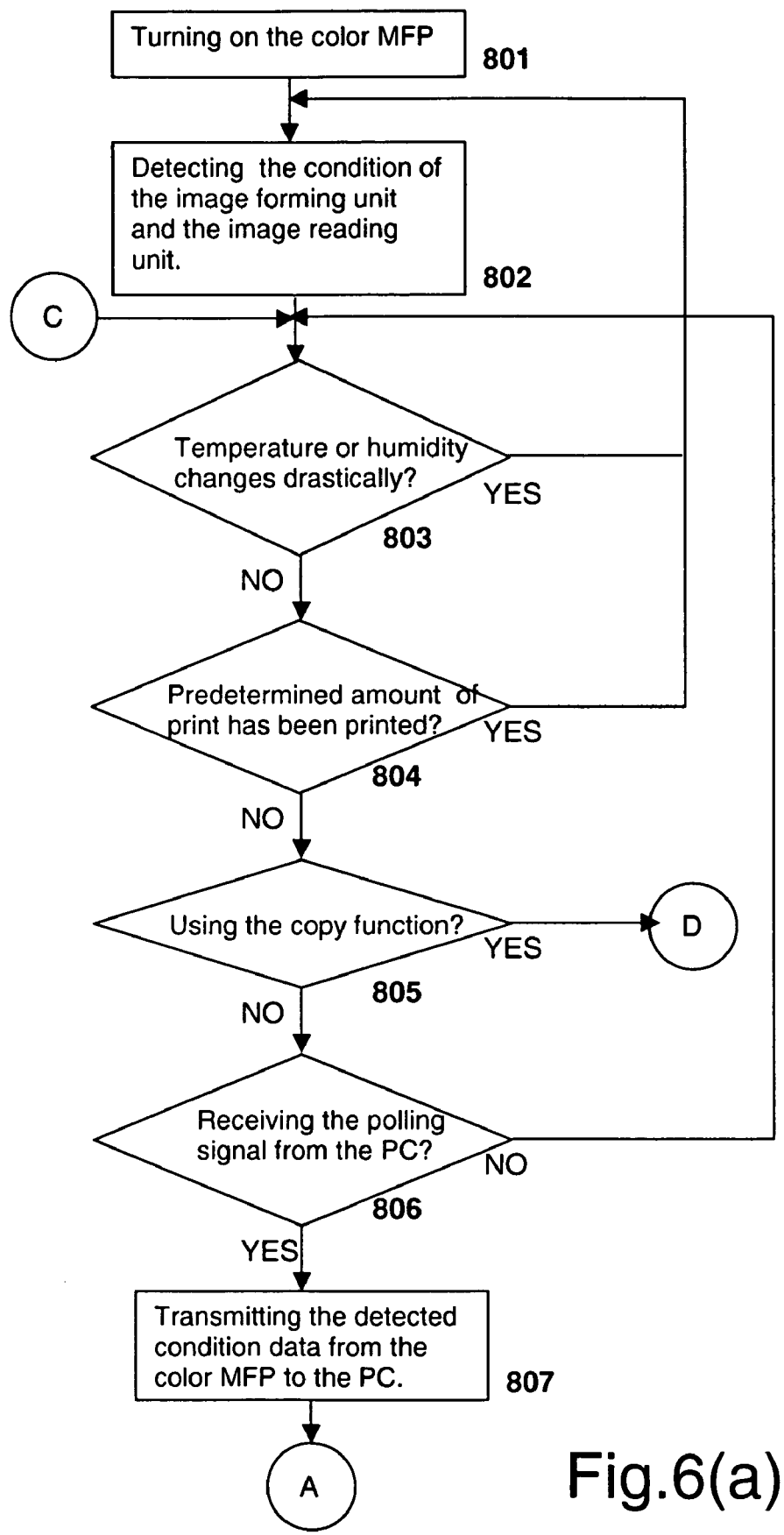
FIGS. 6(a), (b), (c) and (d) illustrates a flowchart describing the execution of the printer function and the copy function, according to certain embodiments.
Figure 6B:
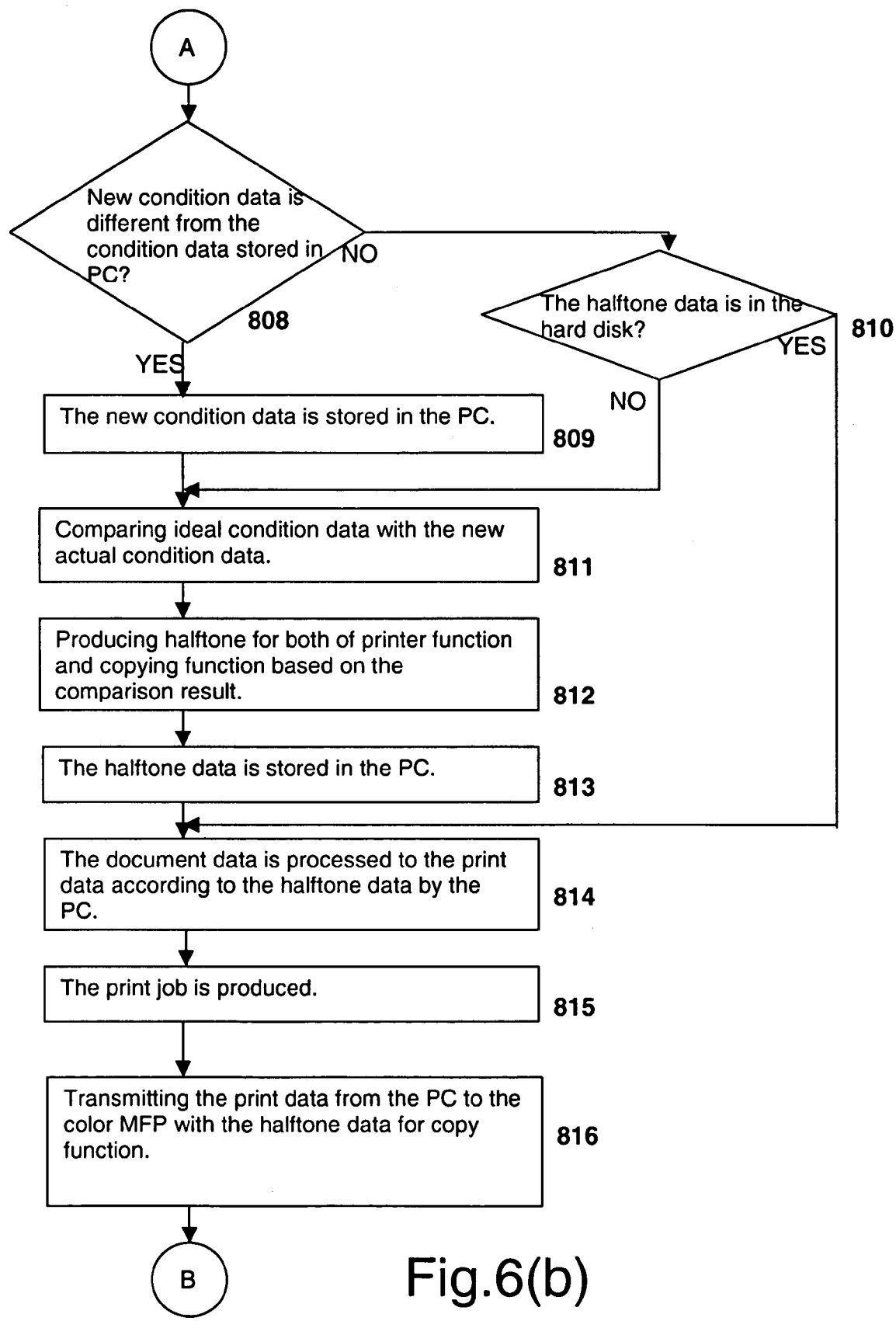
Figure 6C:
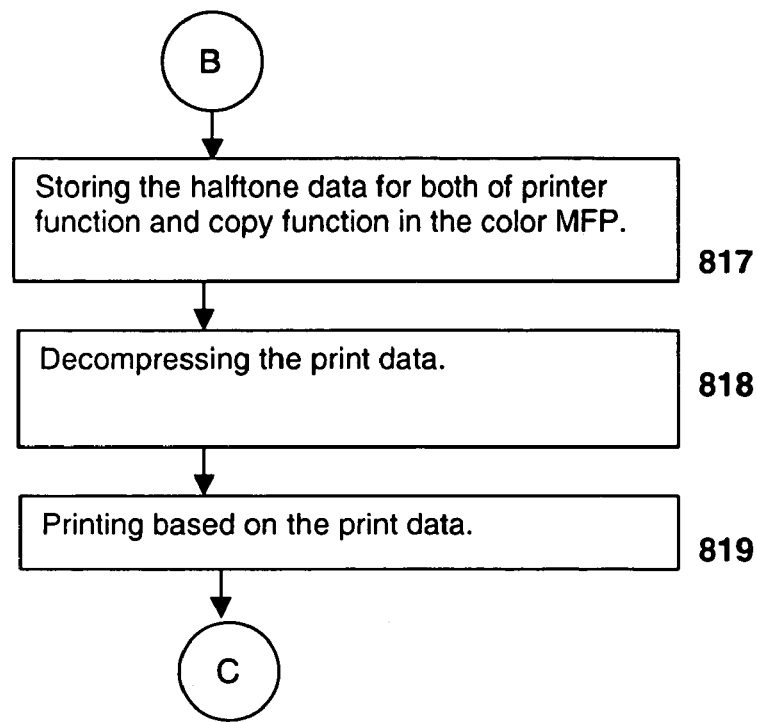
Figure 6D:
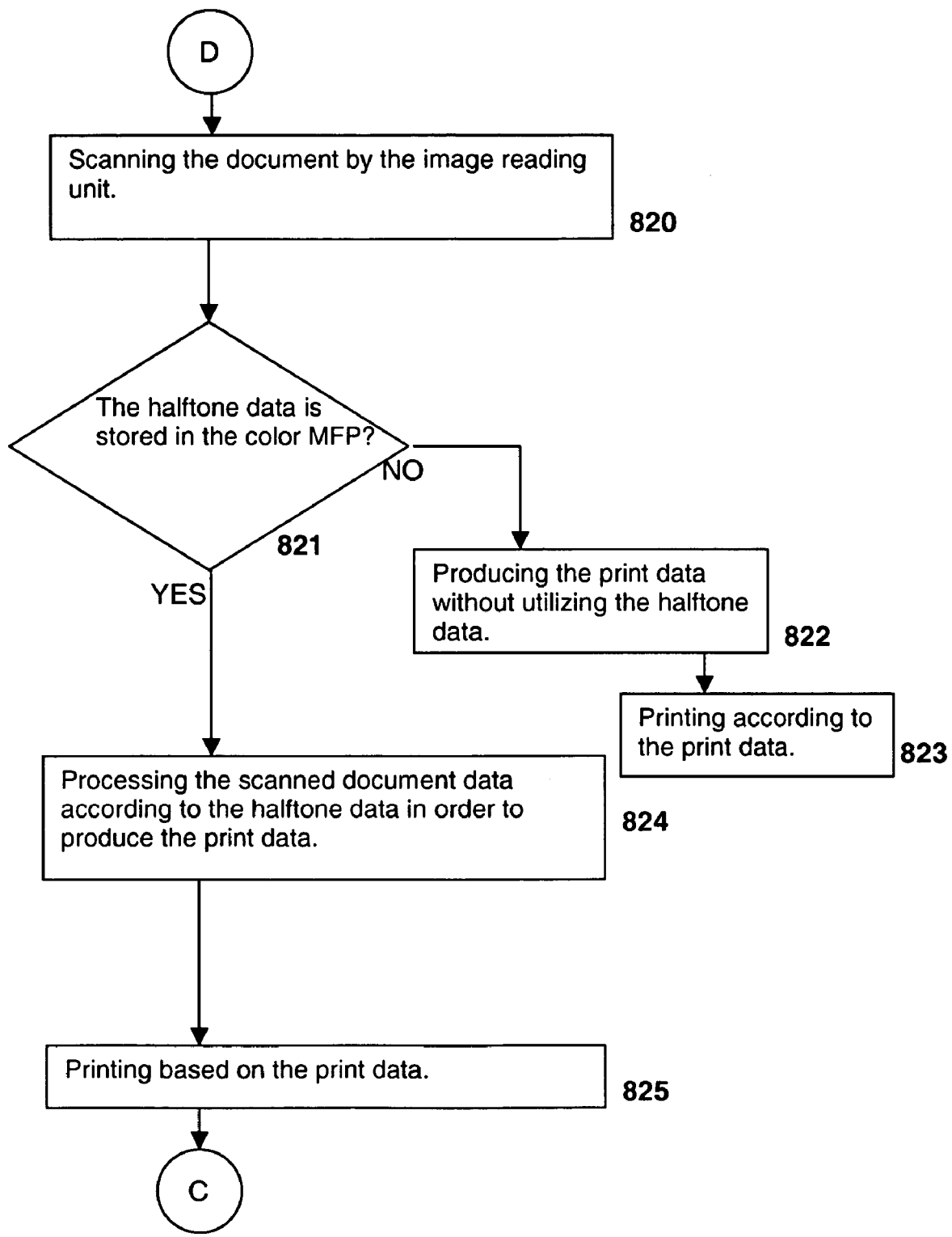

Next, the following describes how to make prints for the printer function as shown in FIGS. 6(a), (b) and (c).

At first, the color MFP 300 can be turned on (801 in FIG. 6(a)). Then, the optical density data as the printing apparatus condition data of the color MFP 300 can be detected as follows (801 in FIG. 6(a)).

Patch patterns corresponding to several pattern numbers (e.g., 0th, 32nd, 64th, 96th, 128th, 160th, 192nd, 224th, 255th) for each color of C, M, Y and K can be formed on the paper transport belt 604. Data of each pattern numbers can be stored in the NVRAM 302 of the color MFP beforehand. In this example, 36 patch patterns (9 pattern numbers×4 colors) can be formed on the paper transport belt 604. When the patch patterns are formed on the paper transport belt 604, the optical density of each of 36 patch numbers can be detected by the optical density sensors 614. In certain embodiments, the printing apparatus condition data can be stored in the NVRAM 302.

After tuning on the color MFP, if the temperature sensor 616 detects that the difference between current temperature and the temperature at the last detection of the printing apparatus condition data is 10° C. or more, or the humidity sensor 617 detects that the difference between current humidity and the humidity at the last detection of the printing apparatus condition data is 10% or more, the printing apparatus condition data of the color MFP 300 can be detected again by the way mentioned in the above (803 in FIG. 6(a)). In certain embodiments, the new printing apparatus condition data of the image forming unit 600 and the image reading unit 500 can be stored in the NVRAM 302.

After tuning on the color MFP, if the counter (not shown) counts a predetermined amount of prints(e.g., every 200 sheets), the printing apparatus condition data of the color MFP 300 can be detected again by the way mentioned in the above(804 in FIG. 6(a)). In certain embodiments, the new printing apparatus condition data of the image forming unit 600 and the image reading unit 500 can be stored in the NVRAM 302.

In certain embodiments, when the new printing apparatus condition data is stored in the NVRAM 302, the old printing apparatus condition data can be deleted from the NVRAM 302.

In certain embodiments, the user can make a document data by utilizing the application software (e.g., Microsoft Word, Adobe Photoshop and the like) installed in the PC 100. Or, the user make the document data by the other devices and then can download the document data into the PC 100 via a removable recording media (e.g., CD-R, DVD-R, FD and the like) or the network. Then, if the user wants to print the document data, the user can instruct start printing by clicking an icon of "print start" displayed on the color LCD display 105 by using the keyboard 107 or the mouse 104 of the PC 100 after deciding the print condition (e.g., number of copies, paper size and the like) by the keyboard 107 or the mouse 104.

In certain embodiments, the printer driver can be installed in the PC 100. When the user instructs start printing, the printer driver can produce a polling signal to ask the printing apparatus condition data to the color MFP 300. In certain embodiments, the polling signal can be sent from the LAN adaptor 103 of the PC 100 to the color MFP 300 through the LAN 700. Then, the network card 304 of the color MFP 300 can receive the polling signal. (806 in FIG. 6(*a*)) If the color MFP 300 receives the polling signal from the PC 100, the color MFP 300 can read the printing apparatus condition data (e.g., the optical density data 1) from the NVRAM 302, and transmit the printing apparatus condition data from the network card 304 to the PC 100 which sent the polling signal (807 in FIG. 6(*a*)).

In certain embodiments, the hard disk 102 of the PC 100 can store the printing apparatus condition data sent from the color MFP 300. When the PC 100 receives the new printing apparatus condition data from the color MFP 300, the CPU 101 can compare the new printing apparatus condition data sent from the color MFP 300 with the old printing apparatus condition data stored in the hard disk 102 of the PC 100 (808 in FIG. 6(*b*)). If the CPU 101 judges that the new printing apparatus condition data is different from the old printing apparatus condition data, the new printing apparatus condition data can be stored in the hard disk 102 of the PC 100 and the old printing apparatus condition data can be deleted from the hard disk 102 (809 in FIG. 6(*b*)). On the other hand, if the CPU 101 judges that the new printing apparatus condition data is same as the old printing apparatus condition data, the new printing apparatus condition data may not be stored in the hard disk 102 and the CPU 101 can judge whether the halftone data which is the density correction data as the image enhanced data is stored in the hard disk 102 or not. (810 in FIG. 6(*b*))

If the CPU 101 judges that the halftone data is stored in the hard disk 102, the PC 100 does not produce the new halftone data and start producing the print data based on the halftone data stored in the hard disk 102. (814 in FIG. 6(*b*)) If the CPU 101 judges that the halftone data is not stored in the hard disk 102, the PC 100 can start producing the halftone data based on the old printing apparatus condition data stored in the hard disk 102.

In certain embodiments, the hard disk 102 of the PC can store ideal optical density data 2 as ideal printing apparatus condition data. The ideal printing apparatus condition data can be stored in the hard disk 102 when the software of the printer driver including the ideal printing apparatus condition data is installed in the PC 100.

After the PC 100 receives the printing apparatus condition data, the CPU 101 as the image enhanced data producing section can compare the actual optical density data 1 as the actual printing apparatus condition data sent from the color MFP 100 with the ideal optical density data 2 as the ideal printing apparatus condition data. (811 in FIG. 6(*b*)) According to the result of the comparison between the detected optical density data 1 and the ideal optical density data 2, the CPU 101 with the software for calculation of the halftone data included in the printer driver can produce the halftone data by reorganizing the halftone data according to an inverse function so that the actual optical density data 1 can be getting same or close to the ideal optical density data 2. (812 in FIG. 6(*b*)) In certain embodiments, the halftone data can be the image enhanced data for both of the printer function and the copy function. The halftone data as the image enhanced data can be stored in the hard disk 102. (813 in FIG. 6(*b*))

In certain embodiments, the CPU 101 as the image processing section can render the document data which is according to the GDI command and produce 8 bit bitmap data for each color of R, G and B. Then, the CPU 101 can conduct color conversion to the 8 bit bitmap data and produce the 8 bit bitmap data for each color of Y, M, C and K. The CPU 101 can conduct the halftone processing to the 8 bit bitmap data according to the halftone data as the image enhanced data and produce the print data which is the 1 bit bitmap data for each color of Y, M, C and K. Therefore, the CPU 101 as the image processing section can produce the print data by rasterizing the document data according to the halftone data. (814 in FIG. 6(*b*))

In certain embodiments, the CPU 101 can compress the print data according to JBIG format and produce a print job including the compressed print data and the print condition data. (815 in FIG. 6(*b*)) Then, the print job with the half tone data as the image enhanced data can be transmitted from the LAN adaptor 103 of the PC 100 to the color MFP 300 through the LAN 700. (816 in FIG. 6(*b*))

In certain embodiments, the Network card 304 of the color MFP 300 can receive the print job with the halftone data. The halftone data for the copy function can be stored in the NVRAM 302. (817 in FIG. 6(*c*)) In certain embodiments, the image processing section 505 can decompress the print data included in the print job and the color MFP 300 can obtain the print data. (818 in FIG. 6(*c*))

In certain embodiments, the image forming unit 600 of the color MFP 300 can print according to the decompressed print data and the print condition data by the way disclosed in the above. (819 in FIG. 6(*c*))

Next, the following describes how to make prints for the copy function as shown in FIGS. 6(*a*), (*b*) and (*c*).

In certain embodiments, if the user selects to use the copy function from the operation panel (not shown) (805 in FIG. 6(*a*)), a document such as a paper document, a book, a notebook and the like can be scanned by the image reading unit 500 by the way disclosed in the above. By scanning and processing by the image processing unit 505, the document data which is the 8 bit bitmap data for each color for R, G and B can be obtained. (820 in FIG. 6(*d*))

In certain embodiments, the CPU 301 can judge whether the halftone data as the image enhanced data is stored in the NVRAM 302 as the image enhanced data storing section. (821 in FIG. 6(*d*)).

If the CPU 301 judges that the halftone data is not stored in the NVRAM 302, the image processing unit 505 including the rasterizer can subject the document data to the color conversion and the 8 bit bitmap data for each color of Y, M, C and K can be obtained. Then, the image processing unit 505 can subject the 8 bit bitmap data to the halftone processing without the image enhanced data and the print data of 1 bit bitmap data for each color of Y, M, C and K can be obtained. (822 in FIG. 6(*d*)) After that, the image forming unit 600 can print according to the print data by the way disclosed in the above. (823 in FIG. 6(*d*))

If the CPU 301 judges that the halftone data is stored in the NVRAM 302, the image processing unit 505 including the rasterizer can subject the document data of 8 bit bitmap data to the color conversion and the bitmap data of 8 bit for each color of Y, M, C and K can be obtained. Then, the image processing unit 505 can subject the bitmap data to the halftone processing according to the halftone data as the image enhanced data stored in the NVRAM 302 and the print data of 1 bit bitmap data for each color of Y, M, C and K can be obtained. (824 in FIG. 6(*d*)) After that, the image forming unit 600 can print according to the print data by the way disclosed in the above. (825 in FIG. 6(*d*))

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A printing and copying system comprising:
a host computer and a printing apparatus having a printer function and a copy function, wherein the host computer comprises:
an image enhanced data producing section which produces first image enhanced data for printing and second image enhanced data for copying, and
wherein the printing apparatus comprises:
an image enhanced data storing section which stores the first and second image enhanced data produced by the image enhanced data producing section of the host computer;
a print data producing section which produces print data; and
a print section,
wherein the print data producing section produces the print data by modifying document data received by the printing apparatus according to the first image enhanced data stored in the image enhanced data storing section when performing the printer function;
produces the print data by modifying the document data received by the printing apparatus according to the second image enhanced data stored in the image enhanced data storing section when performing the copy function; and
wherein the print section prints according to the print data produced by the print data producing section when performing the printer function, and copies according to the print data produced by the print data producing section when performing the copy function.

2. The printing system of claim 1, wherein the printing apparatus further comprises a detecting section, and
wherein the detecting section detects printing apparatus condition data, and
wherein the image enhanced data producing section produces the first and second image enhanced data based on the printing apparatus condition data detected by the detecting section.

3. The printing system of claim 2, wherein the detecting section detects the printing apparatus condition data when the printing apparatus is turned on.

4. The printing system of claim 2, wherein the detecting section detects the printing apparatus condition data when a predetermined amount of papers is printed.

5. The printing system of claim 2, wherein the detecting section detects the printing apparatus condition data when environmental condition changes drastically.

6. The printing system of claim 2, wherein the printing apparatus condition data detected by the detecting section is transmitted from the printing apparatus to the host computer every time after the detecting section detects the printing apparatus condition data.

7. The printing system of claim 2, wherein the printing apparatus condition data detected by the detecting section is transmitted from the printing apparatus to the host computer after the printing apparatus receives a polling signal transmitted from the host computer.

8. The printing system of claim 1,
wherein the host computer transmits the first image enhanced data with the document data or the print data every time when the document data or the print data is transmitted from the host computer to the printing apparatus, and the image enhanced data storing section stores the first image enhanced data transmitted from the host computer.

9. The printing system of claim 1, wherein the host computer transmits the first or second image enhanced data every time after the image enhanced data producing section of the host computer produces the image enhanced data, and the image enhanced data storing section stores the first or second image enhanced data transmitted from the host computer.

10. The printing system of claim 1,
wherein the print data is produced without using the second image enhanced data stored in the image enhanced data storing section when performing the printer function, and
wherein the host computer comprises an image processing section, and
wherein the image processing section of the host computer produces the print data by modifying the document data when performing the printer function.

11. The printing system of claim 1, wherein the first and second image enhanced data comprises density correction data.

12. The printing system of claim 11, wherein the density correction data is a half-tone.

13. The printing system of claim 11, wherein the density correction data is a tone curve.

14. The printing system of claim 1, wherein the first and second image enhanced data comprises moiré removal data.

15. A printing and copying system comprising:
a host computer comprising;
means for producing image enhanced data for printing and second image enhanced data for copying; and
a printing apparatus having a printer function and a copy function, comprising:
means for storing the first and second image enhanced data produced by the image enhanced data producing means of the host computer;
means for producing a print data; and
means for printing,
wherein the print data producing means produces the print data by modifying document data received by the printing apparatus according to the first image enhanced data stored in the image enhanced data storing means when performing the printer function;
produces the print data by modifying the document data received by the printing apparatus according to the second image enhanced data stored in the imacie enhanced data storincj means when performing the copy function; and
wherein the printing means prints according to the print data produced by the print data producing means when performing the printer function, and copies according to the print data produced by the print data producing means when performing the copy function.

16. A removable data recording medium that stores instructions, which when executed by a host computer perform steps in a method for representing configuration options available on devices in a printing and copying system comprising the host computer and a printing apparatus, the steps comprising:
transmitting a polling signal from the host computer to the printing apparatus to request printing apparatus condition data;
obtaining the printing apparatus condition data from the printing apparatus;

producing image enhanced data based on the printing apparatus condition data, wherein the image enhanced data comprises first image enhanced data for printing and second image enhanced data for copying;

transmitting the first and second image enhanced data from the host computer to the printing apparatus with document data or print data when the document data or the print data is transmitted from the host computer to the printing apparatus.

* * * * *